(12) United States Patent
Bowlan et al.

(10) Patent No.: US 7,817,282 B2
(45) Date of Patent: Oct. 19, 2010

(54) USE OF CROSSED-BEAM SPECTRAL INTERFEROMETRY TO CHARACTERIZE OPTICAL PULSES

(75) Inventors: Pamela Bowlan, Atlanta, GA (US); Pablo Gabolde, Atlanta, GA (US); Rick Trebino, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 566 days.

(21) Appl. No.: 11/750,135

(22) Filed: May 17, 2007

(65) Prior Publication Data

US 2008/0285031 A1 Nov. 20, 2008

(51) Int. Cl.
*G01B 9/02* (2006.01)
*G01J 3/45* (2006.01)

(52) U.S. Cl. ........................................ 356/456; 356/477
(58) Field of Classification Search ................ 356/450, 356/451, 456, 477
See application file for complete search history.

(56) References Cited

U.S. PATENT DOCUMENTS

| 5,530,544 | A   | * | 6/1996  | Trebino et al.  | 356/450 |
|-----------|-----|---|---------|-----------------|---------|
| 6,219,142 | B1  | * | 4/2001  | Kane            | 356/450 |
| 6,611,336 | B1  | * | 8/2003  | Walmsley et al. | 356/450 |
| 6,633,386 | B2  | * | 10/2003 | Walmsley et al. | 356/450 |
| 6,819,428 | B2  | * | 11/2004 | Ogawa           | 356/450 |
| 7,042,629 | B2  | * | 5/2006  | Doerr et al.    | 359/325 |
| 7,053,996 | B2  | * | 5/2006  | Ogawa           | 356/73.1 |
| 7,133,135 | B2  | * | 11/2006 | Dorrer          | 356/450 |
| 7,298,489 | B2  | * | 11/2007 | Dorrer          | 356/450 |
| 7,352,469 | B2  | * | 4/2008  | McGrew          | 356/451 |
| 7,428,085 | B2  | * | 9/2008  | Hosono et al.   | 359/27  |
| 7,551,267 | B2  | * | 6/2009  | Bernath et al.  | 356/5.01 |
| 7,570,851 | B2  | * | 8/2009  | Weiner          | 385/36  |
| 2003/0011776 | A1 | * | 1/2003 | Ogawa          | 356/450 |
| 2003/0025911 | A1 | * | 2/2003 | Walmsley et al. | 356/450 |
| 2003/0123051 | A1 | * | 7/2003 | McGrew         | 356/72  |
| 2004/0032580 | A1 | * | 2/2004 | Piche et al.   | 356/218 |
| 2004/0207850 | A1 | * | 10/2004 | Kwak et al.   | 356/432 |
| 2005/0058449 | A1 | * | 3/2005 | Ogawa          | 398/9   |
| 2005/0185187 | A1 | * | 8/2005 | Dorrer         | 356/450 |
| 2006/0019171 | A1 | * | 1/2006 | Hosono et al.  | 430/1   |
| 2006/0088259 | A1 | * | 4/2006 | Weiner         | 385/122 |

(Continued)

OTHER PUBLICATIONS

Bowlan et al. "Crossed-beam spectral interferometry: a simple, high-spectral-resolution method for completely characterizing complex ultrashort pulses in real time" Optics Express, vol. 14, No. 24, Nov. 27, 2006. pp. 11892-11900.*

(Continued)

*Primary Examiner*—Patrick J Connolly
(74) *Attorney, Agent, or Firm*—Thomas, Kayden, Horstemeyer & Risley, LLP (57) ABSTRACT

Disclosed are an apparatus and methods for determining electric field characteristics of pulses. In one example, a method is provided in which an unknown pulse is propagated through a first optical fiber. A reference pulse is propagated through a second optical fiber. The unknown pulse and the reference pulse are directed out of the first and second optical fibers into a spectrometer. The unknown pulse and the reference pulse propagate along a pair of crossing trajectories through the spectrometer to form an interferogram. The electric field of the unknown pulse is determined by processing this interferogram.

24 Claims, 5 Drawing Sheets

U.S. PATENT DOCUMENTS

2008/0165355 A1* 7/2008 Yasui et al. ............... 356/323
2008/0285031 A1* 11/2008 Bowlan et al. ............. 356/326

OTHER PUBLICATIONS

W. Amir, T.A. Planchon, C.G. Durfee, J.A. Squier, P. Gabolde, R. Trebino and M. Muller, "Simultaneous Visualization of Spatial and Chromatic Aberrations by Two-Dimensional Fourier Transform Spectral Interferometry", vol. 31, No. 19/Optics Letters; Mar. 27, 2006, pp. 2927-2929.

A.P. Kovacs, K. Osvay, ZS. Bor and R. Szipocs, "Group-Delay Measurement on Laser Mirrors by Spectrally Resolved White-Light Interferometry", Optics Letters/vol. 20, No. 7,Oct. 6, 1994, pp. 788-790.

Zoltan L. Horvath, Zsolt Bor, "Focusing of Truncated Gaussian Beams", Optics Communications 222, pp. 51-68, www.sciencedirect.com; Sept. 23, 2002, pp. 51-68.

A.P. Kovacs, K. Osvay, G. Kurdi, M. Gorbe, J. Klebniczki and Z. Bor, "Dispersion Control of Pulse Stretcher-Compressor System with Two-Dimensional Spectral Interferometry", Oct. 18, 2004, Springer-Verlang 2004, Appl. Phys. B80, pp. 165-170.

CL. Froehly, A. Lacourt, et J. CH. Vienot, "Notions de Reponse Impulsionnelle et de Fonction de Transfert Temporelles des Pupilles Optiques, Justifications Experimentales et Applications", Nouv. Rev. Optique, 1973, t. 4, No. 4, pp. 183-196.

Eric Cormier, Ian A. Walmsley, Ellen M. Kosik, Adam S. Wyatt, Laura Corner and Louis F. Dimauro, "Self-Referencing, Spectrally, or Spatially Encoded Spectral Interferometry for the Complete Characterization of Attosecond Eletromagnetic Pulses", Physical Review Letters, Jun. 9, 2004, The American Physical Society, pp. 33905-1-33905-4.

David N. Fittinghoff, Jason L. Bowie, John N. Sweetser, Richard T. Jennings, Marco A. Krumbugel, Kenneth W. Delong, Rick Trebino and Ian A. Walmsley, "Measurement of the Intensity and Phase of Ultraweak, Ultrashort Laser Pulses", Optics Letters/vol. 31, No. 12, Jan. 11, 1996, pp. 884-886.

J.P. Geindre, P. Audebert, S. Rebibo, and J.C. Gauthier, "Single-Shot Spectral Interferometry with Chirped Pulses", Optics Letters/vol. 26, No. 20, Jan. 3, 2001, pp. 1612-1614.

J.P. Geindre, P. Audebert, A. Rousse, F. Fallies, J.C. Gauthier, A. Mysyrowicz, A. Dos Santos, G. Hamoniaux, and A. Antonetti, "Frequency-Domain Interferometer for Measuring the Phase and Amplitude of a Femtosecond Pulse Probing a Laser-Produced Plasma", Optics Letters/vol. 19, No. 23, Jun. 8, 1994, 1997-1999.

J. Jasapara and W. Rudolph, "Characterization of Sub-10-fs Pulse Focusing with High-Numerical-Aperture Microscope Objectives", Optics Letters/vol. 24, No. 11, Jan. 4, 1999, pp. 777-779.

L. Lepetit, G. Cheriaux, and M. Joffre, "Linear Techniques of Phase Measurement by Femtosecond Spectral Interferometry for Applications in Spectroscopy", J. Opt. Soc. Am. B/vol. 12, No. 12, Mar. 29, 1995, pp. 2467-2474.

D. Meshulach, D.Yelin, andY. Silberberg, "Real-Time Spatial-Spectral Interference Measurements of Ultrashort Optical Pulses", J. Opt. Soc. Am. B/vol. 14, No. 8, Jan. 31, 1997, pp. 2095-2098.

Robert J. Levis, Getahun M. Menkir, Herschel Rabitz, "Selective Bond Dissociation and Rearrangement with Optimally Tailored, Strong-Field Laser Pulses" Science/vol. 292, pp. 709-713, Apr. 27, 2001, pp. 709-713.

Daniel J. Kane and Rick Trebino, "Characterization of Arbitrary Femtosecond Pulses Using Frequency-Resolved Optical Gating", IEEE Journal of Quantum Electronics/vol. 29, No. 2, Feb. 1993, pp. 571-579.

Dan Oron andYaron Silberberg, "Spatiotemporal Coherent Control Using Shaped, Temporally Focused Pulses", Optics Express/vol. 13, No. 24, Oct. 31, 2005, pp. 9903-9908.

Chris Iaconis and Ian A. Walmsley, "Self-Referencing Spectral Interferometry for Measuring Ultrashort Optical Pulses", IEEE Journal of Quantum Electronics/vol. 35, No. 4, Apr. 1999, pp. 501-509.

M. Kempe and W. Rudolph, "Femtosecond Pulses in the Focal Region of Lenses", The American Physical Society/ vol. 48, No. 6, Apr. 15, 1993, pp. 4721-4729.

M. Kempe and W. Rudolph, "Impact of Chromatic and Spherical Aberration on the Focusing of Ultrashort Light Pulses by Lenses", Optics Letters/vol. 18, No. 2, Aug. 17, 1992, pp. 137-139.

M. Mueller, J. Squier, and G.J. Brakenhoff, Measurement of Femtosecond Pulses in the Focal Point of a High-Numerical-Aperture Lens by Two-Photon Absorption, Optics Letters/vol. 20, No. 9, Sep. 12, 1994, pp. 1038-1040.

M. Kempe, U. Stamm, B. Wilhelmi and W. Rudolph, "Spatial and Temporal Transformation of Femtosecond Laser Pulses by Lenses and Lens Systems", J. Opt. Soc. Am. B/vol. 9, No. 7, Jan. 21, 1992, pp. 1058-1065.

Vadim V. Lozovoy, Igor Pastirk, and Marcos Dantus, "Multiphoton Intrapulse Interference. IV. Ultrashort Laser Pulse Spectral Phase Characterization and Compensation", Optics Letters/vol. 29, No. 7, Aug. 4, 2003, pp. 775-777.

Jonathan R. Birge, Richard Ell, and Franz X. Kartner, Two-Dimensional Spectral Shearing Interferometry for Few-Cycle Pulse Characterization, Optics Letters/vol. 31, No. 13, Mar. 7, 2006, pp. 2063-2065.

Zsolt Bor, Zoltan Gogolak and Gabor Szabo, "Femtosecond-Resolution Pulse-Front Distortion Measurement by Time-of-Flight Interferometry" Optics Letters/vol. 14, No. 16, Feb. 13, 1989, pp. 862-864.

Rebecca Chadwick, Erik Spahr, Jeff A. Squier, Charles G. Durfee, Barry C. Walker, and David N. Fittinghoff, Fringe-Free, Background-Free, Collinear Third-Harmonic Generation Frequency-Resolved Optical Gating Measurements for Multiphoton Microscopy, Optics Letters/vol. 31, No. 22, Jul. 10, 2006, pp. 3366-3368.

David N. Fittinghoff, Jeff A. Squier, C.P.J. Barty, John N. Sweetser, Rick Trebino, and Michiel Muller, "Collinear Type II Second-Harmonic-Generation Frequency-Resolved Optical Gating for Use with High-Numerical-Aperature Objectives", Optics Letters/vol. 23, No. 13, Mar. 19, 1998, pp. 1046-1048.

Ulrike Fuchs, Uwe D. Zeitner and Andreas Tunnermann, "Ultra-Short Pulse Propagation in Complex Optical Systems", Optics Express/vol. 13, No. 10, Mar. 17, 2005, pp. 3852-3861.

Andrei B. Vakhtin, Kristin A. Peterson, William R. Wood, and Daniel J. Kane,"Differential Spectral Interferometry: An Imaging Technique for Biomedical Applications", Optics Letters/vol. 28, No. 15, Feb. 24, 2003, pp. 1332-1334.

Nirit Dudovich, Dan Oron and Yaron Silberberg," Single-Pulse Coherently Controlled Nonlinear Raman Spectroscopy and Microscopy", Nature/vol. 418, Aug. 2002, pp. 512-514.

Pamela Bowlan, Pablo Gabolde, Aparna Shreenath, Kristan Marshall, Selcuk Akturk, and Rick Trebino, Cross-Beam Spectral Interferometry: A Simple, High-Spectral-Resolution method for Completely Characterizing Complex Ultrashort Pulses in Real Time, Optics Express, vol. 14, No. 24, Nov. 27, 2006, pp. 11892-11900.

J.P. Geindre, P. Audebert, A. Rousse, F. Fallies, J.C. Gauthier, A. Mysyrowicz, A.Dos Santos, G. Hamoniaux, and A. Antonetti, "Frequency-domain interferometer for measuring the phase and amplitude of a femtosecond pulse probing a laser-produced plasma," Optics Letters, vol. 19, No. 23, Dec. 1994, pp. 1997-1999.

T. Tanabe, H. Tanabe, Y. Teramura, and F. Kannari, "Spatiotemporal measurements based on spatial spectral interferometry for ultrashort optical pulses shaped by a Fourier pulse shaper," Journal of the Optical Society of America, vol. 19, No. 11, Nov. 2002, pp. 2795-2802.

I. Gallman, G. Steinmeyer, D.H. Sutter, T. Rupp, C. Iaconis, I.A. Walmsley, and U. Keller, "Spatially resolved amplitude and phase characterization of femtosecond optical pulses," Optics Letters, vol. 26, No. 2, Jan. 2001, pp. 96-98.

C. Dorrer, E.M. Kosik, and I.A. Walmsley, "Direct space-time characterization of the electric fields of ultrashort optical pulses," Optics Letters, vol. 27, No. 7, Apr. 2002, pp. 548-550.

S.A. Diddams, H. K. Eaton, A.A Zozulya, and T.S. Clement, "Full-field characterization of femtosecond pulses after nonlinear propagation," Conference on Lasers and Electro-Optics, Paper CFF3, May 1998, p. 519.

J. Liang, B. Grimm, S. Goelz, and J.F. Bille, "Objective measurement of wave aberrations of the human eye with the use of a Hartmann-Shack wave-front sensor," Journal of the Optical Society of America, vol. 11, No. 7, Jul. 1994, pp. 1949-1957.

E. Leith, C. Chen, H. Chen, Y. Chen, D. Dilworth, J. Lopez, J. Rudd, P.C. Sun, J. Valdmanis, and G. Vossler, "Imaging through scattering media with holography," Journal of the Optical Society of America, vol. 9, No. 7, Jul. 1992, pp. 1148-1153.

S. Grilli, P. Ferraro, S. De Nicola, A. Finizio, G. Pierattini, and R. Meucci, "Whole optical wavefields reconstruction by Digital Holography," Optics Express, vol. 9, No. 6, Sep. 2001, pp. 294-302.

Z. Liu, M. Centurion, G. Panotopoulos, J. Hong, and D. Psaltis, "Holographic recording of fast events on a CCD camera," Optics Letters, vol. 27, No. 1, Jan. 2002, pp. 22-24.

P.H. Lissberger, "Properties of All-Dielectric Interference Filters. I. A New Method of Calculation," Journal of the Optical Society of America, vol. 49, No. 2, Feb. 1959, pp. 121-125.

P. O'Shea, M. Kimmel, X. Gu, and R. Trebino, "Highly simplified device for ultrashort-pulse measurement," Optics Letters, vol. 26, No. 12, Jun. 2001, pp. 932-934.

P. Gabolde and R. Trebino, "Single-shot Measurement of the Complete Spatio-temporal Intensity and Phase of an Ultrashort Laser Pulse," Conference on Lasers and Electro-Optics, May 21-26, 2006, Long Beach, California, pp. 1-2.

P. Gabolde and R. Trebino, "Single-shot Holographic Technique for Measuring the Complete Electric Field of an Ultrashort Pulse," Optical Society of America Annual Meeting, Oct. 8-12, 2006, Rochester, NY, 1 page.

P. Gabolde and R. Trebino, "Measurement of the Complete Electric Field of an Ultrashort Laser Pulse from a Single-Exposure Digital Hologram," International Conference on Ultrafast Phenomena, Jul. 31, 2006-Aug. 4, 2006, Pacific Grove, California, pp. 1-3.

P. Gabolde and R. Trebino, "Single-shot measurement of the full spatiotemporal field of ultrashort pulses with multispectral digital holography," Optics Express, Vol. 14, No. 23, Nov. 2006, pp. 11460-11467.

R.G. Lane and M. Tallon, "Wave-front reconstruction using a Shack-Hartmann sensor," Applied Optics, vol. 31, No. 32, Nov. 1992, pp. 6902-6908.

P. Gabolde and R. Trebino, "Self-referenced measurement of the complete electric field of ultrashort pulses," Optics Express, vol. 12, No. 19, Sep. 2004, pp. 4423-4429.

* cited by examiner

USE OF CROSSED-BEAM SPECTRAL INTERFEROMETRY TO CHARACTERIZE OPTICAL PULSES

STATEMENT REGARDING FEDERALLY SPONSORED RESEARCH OR DEVELOPMENT

This invention was made with government support under agreement 0539595 awarded by the National Science Foundation. The Government has certain rights in this invention.

BACKGROUND

In ultrafast optics laboratories it is often desirable to measure the spatial or temporal profile of ultrashort pulses. In some situations, the temporal behavior of the pulse can depend on spatial coordinates, and separate spatial and temporal measurements are insufficient in order to obtain the desired profile, and complete spatio-temporal dependence of the pulse is needed. For example, a pulse can be contaminated by spatio-temporal distortions, such as spatial chirp, pulse-front tilt, or angular dispersion, which limit the performance of an ultrafast system such as might be the case, for example, with amplified or focused pulses. Alternatively, the pulse may have been used to excite or probe complex media with time-varying spatial structure. Indeed, spatio-temporal distortions are quite common, and only very carefully and precisely aligned pulses can be considered to be free of such distortions. Unfortunately, such precisely aligned pulses are generally obtained at significant cost and effort.

Also, there are situations in which the pulse may or may not have spatio-temporal distortions, but instead may simply be complex in time.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figures 1, 2:
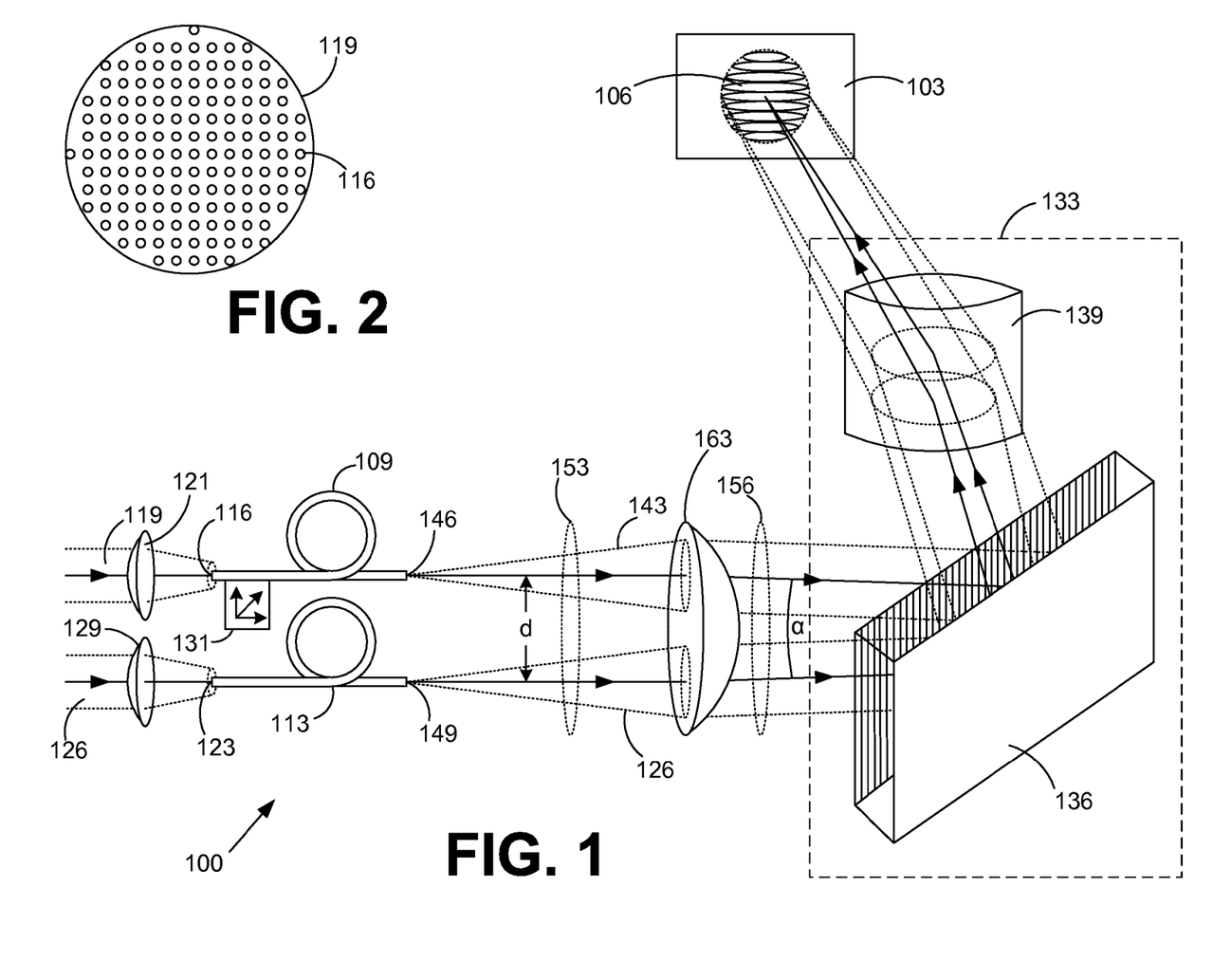
FIG. 1 is a drawing of a crossed-beam implementation of a spectral interferometer employed to determine the electric field of an optical pulse according to an embodiment of the present invention.
FIG. 2 is a drawing of a cross section of an input pulse received by the inteferometer of FIG. 1 according to an embodiment of the present invention.

With reference to FIG. 1, shown is an interferometer 100 according to an embodiment of the present invention. The interferometer 100 includes an image capture device 103 that may comprise, for example, a camera having a capture charge coupled device (CCD) array. The interferometer 100 is employed to create an interferogram 106 on the CCD array of the image capture device as will be described.

The interferometer 100 includes a first optical fiber 109 and a second optical fiber 113. The first optical fiber 109 has a point of entry 116 into which at least a portion of an input pulse 119 is directed. The unknown input pulse 119 may propagate directly into the first optical fiber 109, or, to more efficiently collect its light, it may propagate through a lens 121 that focuses the input pulse 119 as it propagates toward the point of entry 116 of the first optical fiber 109. Also, the second optical fiber 113 includes a point of entry 123 into which a focused or unfocused reference pulse 126 is directed. The input pulse 119 may comprise, for example, an ultrashort laser pulse such as a pulse generated by a mode-locked laser or an amplifier, with a pulse duration in the femtosecond regime and a pulse energy in the attojoule to millijoule range. If the input pulse 119 is focused into the first optical fiber 109, where the spot size of the input pulse 119 at the point of entry 116 of the first optical fiber 109 is larger than the area of the point of entry 116 of the first optical fiber 109, then the point of entry 116 can be scanned in various directions to obtain information regarding the entire cross section of the input pulse 119 as will be described.

The interferometer can measure the temporal intensity and phase of a single pulse at one point in space. However, if the nature of the full spatio-temporal electric field of the input pulse 119 is either entirely or partially unknown, and the source of the input pulse 119 is a repeating source that generates multiple input pulses 119 that are substantially the same as can be appreciated, the interferometer 100 provides for the determination of the spatio-temporal electric field profile of the repeated input pulses 119 based on multiple instances of the input pulse 119 as will be described.

The reference pulse 126 may also comprise, for example, an ultrashort laser pulse such as a pulse generated by a mode-locked laser or an amplifier, with a pulse duration in the femtosecond regime and a pulse energy in the attojoule to millijoule range. However, the reference pulse 126 differs from the unknown input pulse 119 in that the temporal electric field of the reference pulse 126 at the entrance to the reference pulse fiber 123 is substantially or known or characterized.

The reference pulse 126 may be focused with a lens 129, for example, to increase the efficiency with which the pulse enters the fiber 123, however, this is not required as long as the reference pulse is spatially homogenous. The input pulse 119 may or may not be focused, where a portion of the input pulse enters the first optical fiber 109 at the point of entry 116. When the input pulse 119 is focused, the point of entry 116 of the first optical fiber 109 is chosen to be smaller than the focus size when complete spatio-temporal measurement is desired.

When complete spatio-temporal measurements of the unknown pulse are desired, the point of entry 116 is coupled to an actuator 131. The actuator 131 provides for the movement of the point of entry 116 in one, two, or three spatial dimensions. For example, the actuator 131 provides for the movement of the point of entry 116 in two dimensions among a plurality of positions within the propagation of a cross section of the input pulse 119. Thus, the ultimate unknown pulse that enters the first optical fiber 109 may be any portion of the input pulse 119 that enters the first optical fiber 109 through the point of entry 116, depending on where the point of entry 116 is located relative to the cross section of the input pulse 119. Also, the actuator 131 provides for movement of the point of entry 116 along an optical axis in the direction of propagation of the input pulse 119. The terms "optical axis" refer to an axis that runs through the center of the various components of an optical system such as the interferometer 100 as can be appreciated.

The interferometer 100 includes a spectrometer 133. For example, the spectrometer 133 may include a grating 136 and a lens 139. Alternatively, it could include a curved grating, or any other spectrometer design well known to those skilled in the art. The spectrometer 133 causes the colors within the beams 143 and 126 to separate spatially so that different colors appear at different horizontal positions at the image capture device 103.

The portion of the input pulse 119 that enters the first optical fiber 109 is designated herein as the unknown pulse 143. The first optical fiber includes an exit face 146 and the second optical fiber also includes an exit face 149. The exit faces 146 and 149 of the first and second optical fibers 109 and 113 are positioned so that the unknown pulse 143 and the reference pulse 126 are directed out of the first and the second optical fibers 109 and 113 into the spectrometer 133. The first optical fiber 109 and the second optical fiber 113 are positioned such that the unknown pulse 143 and the reference pulse 126 exit the first and second optical fibers 109 and 113 and propagate along a pair of parallel trajectories 153.

The unknown pulse 143 and reference pulse 126 propagate through the spectrometer 133 along a pair of crossing trajectories 156. The crossing trajectories 156 are trajectories that ultimately result in the crossing of the unknown pulse 143 and the reference pulse 126 at the image capture device 103. The crossing of the unknown and reference pulses 143 and 126 results in interference that generates an interferogram 106 that is formed on the image capture device 103.

In order to redirect the propagation of the unknown pulse 143 and the reference pulse 126 from the parallel trajectories 153 to the crossing trajectories 156, a lens 163 is employed. The angle at which the unknown pulse 143 and the reference pulse 126 cross may thus be determined by the distance d between the ends of the unknown fiber 116 and the reference fiber 123, and the focal length of the lens 163. Also, the lens 163 collimates the unknown pulse 143 and the reference pulse 126 to prevent expansion of these pulses as they progress through the spectrometer 133 and ultimately reach the image capture device 103. According to various embodiments of the present invention, the phase and intensity as a function of wavelength of the unknown pulse 143 may be determined from the interferogram 106, as set forth above. By scanning the point of entry 116 of the first optical fiber 109, a close approximation of the phase and intensity of the entire input pulse 119 may be substantially determined.

As an alternative, the first and second optical fibers 109 and 113 may be positioned so that the unknown pulse 143 and the reference pulse 126 exit out of the first and second optical fibers 109 and 113 along crossing trajectories toward the spectrometer 133. As such, the lens 163 may not be needed to transition the parallel trajectories to the crossing trajectories as described above, although the unknown pulse 143 and the reference pulse 126 may need to be individually conditioned by a collimating lens as can be appreciated.

Referring next to FIG. 2, shown is a cross section of the propagation of the input pulse 119 relative to a cross section of the point of entry 116 (FIG. 1) of the first optical fiber 109 (FIG. 1). As shown, the point of entry 116 of the first optical fiber 109 may be placed at any one of a number of different positions within the propagation of the cross section of the input pulse 119. Thus, the cross section of the input pulse 119 is greater than the cross section of the point of entry 116 of the first optical fiber 109 when complete spatio-temporal measurements are desired.

Due to this relationship, the unknown pulse 143 ultimately comprises a portion of the input pulse 119 that enters the first optical fiber 109 through the point of entry 116. By virtue of the operation of the actuator 131 (FIG. 1), the point of entry 116 of the first optical fiber 109 can be scanned among a plurality of positions within the propagation of the cross section of the input pulse 119. In this respect, multiple input pulses 119 may be generated and the actuator 131 manipulated so that the point of entry 116 of the first optical fiber 109 is at a different position for each respective input pulse 119.

Thus, at least one unknown pulse 143 may be generated at each position corresponding to a respective one of the input pulses 119. That is to say, that a single unknown pulse 143 is generated for each of the input pulses 119, where the point of entry 116 of the first optical fiber 109 is moved to a different position before the receipt of each new input pulse 119. Thus, each unknown pulse 143 reflects the electric field characteristics of a different position in the cross section of the propagation of the input pulse(s) 119.

As shown with respect to FIG. 2, by appropriately scanning the point of entry 116 of the first optical fiber 109, a unknown pulse 143 from which electric field characteristics may be determined may be obtained from the discrete positions across the cross-section of the repeated input pulse 119. From this information, a generalized view of the electric field of the repeated input pulse 119 may be determined.

Figure 3A:
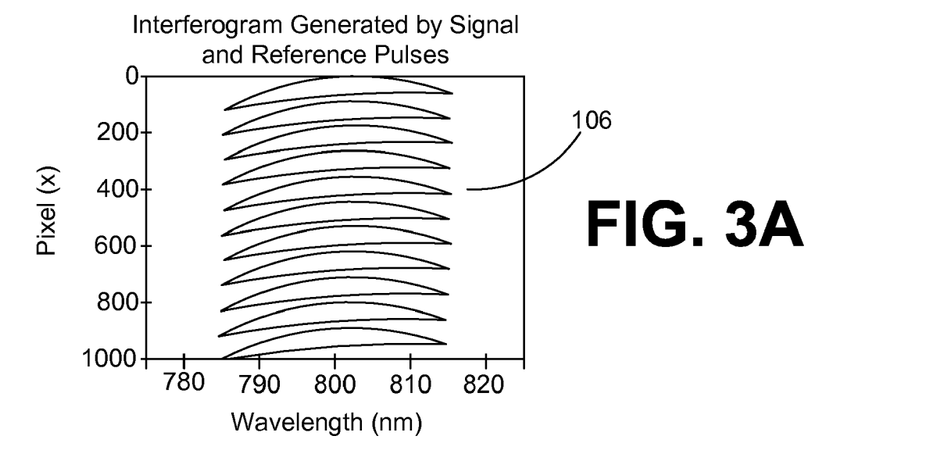
FIG. 3A is a drawing of an interferogram generated on an image capture device of the interferometer of FIG. 1 according to an embodiment of the present invention.

With reference to FIG. 3A, shown is an example of an interferogram 106 according to an embodiment of the present invention. The interferogram 106 is generated by the interference between the unknown pulse 143 (FIG. 1) and the reference pulse 126 (FIG. 1) at the image capture device 103 (FIG. 1) as described above. As shown, the interferogram 106 includes fringes that provide information about the spectral intensity and phase of the unknown pulse 143. As shown in the graph of FIG. 3A, the interferogram 106 is described in terms of the wavelength of the interferogram 106 versus the pixels of the CCD array of the image capture device 103. Alternatively, other scales might be employed other than the pixels of the image capture device 103.

Figure 3B:
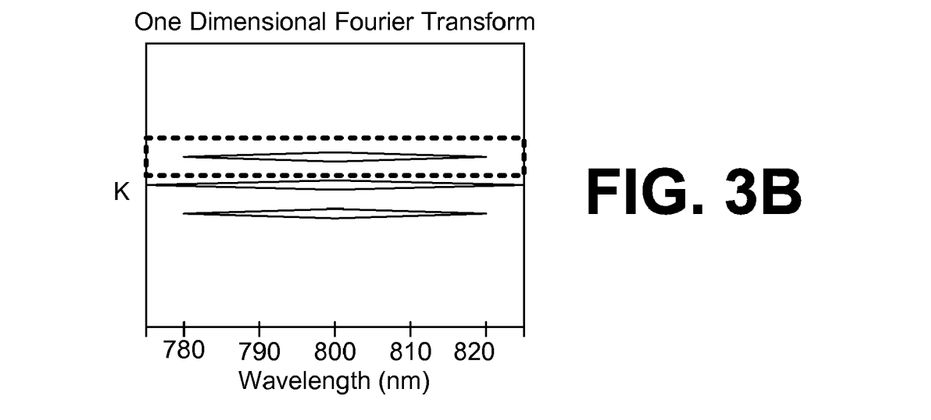
FIG. 3B is a drawing of an image of a Fourier Transform generated from the image of the interferogram of FIG. 3A according to an embodiment of the present invention.

With reference to FIG. 3B, shown is a drawing that provides an approximation of an image generated by performing a one-dimensional Fourier transform of the interferogram 106 depicted with respect to FIG. 3A. As shown, there are three bands that predominantly appear. According to an embodiment of the present invention, one of the side bands is isolated by cropping as such sidebands provide information about the fringes which relates to the spectral intensity and phase of the unknown pulse 143, given the uniformity of the reference pulse 126.

Figure 3C:
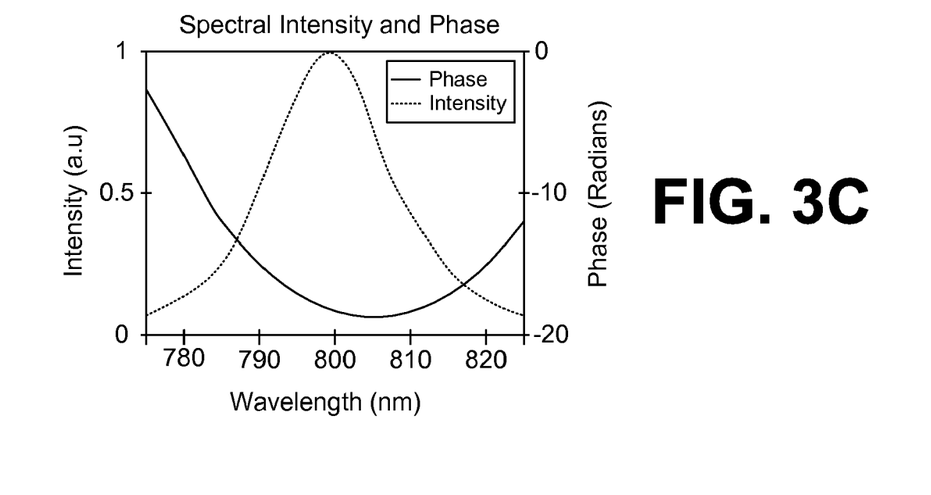
FIG. 3C is a graph of the spectral intensity and phase of an optical pulse generated from an isolated side band of the image of the Fourier Transform of FIG. 3B according to an embodiment of the present invention.

Finally, with reference to FIG. 3C, shown is a graph of the spectral intensity and phase of the unknown pulse 143 determined from the side band information cropped in FIG. 3B. For example, the spectral phase difference between the reference pulse and the unknown pulse is contained in the information of the side bands of the Fourier transform of the interferogram 106 depicted in FIG. 3B. By isolating such side bands as set forth above, the intensity and phase may be determined as a function of wavelength.

With this interferometer the spectral intensity of the unknown pulse 143 is often determined with better resolution than it would be if the conventional device for measuring spectral intensities, a spectrometer, were used. According to the various embodiments of the present invention, the spectral intensity is obtained here by measuring the interferogram 106 and extracting the intensity from the sideband as shown in FIG. 3B. This alternative method results in superior reconstruction of the structure of the spectral intensity whenever a simple reference pulse 126 is used to measure a more complicated unknown pulse 143. If additionally, the unknown pulse shape has zero crossings (such as a sine wave), a second and much larger increase in spectral resolution is experienced. In this case, features in the spectrum that are at least two times smaller, and in some cases many times smaller than the smallest features that an equivalent spectrometer could resolve. This improvement in spectral resolution is referred to here as super resolution. More details about this feature of our interferometer can be found in the following paper: P. Bowlan, P. Gabolde, A. Schreenath, K. McGresham, and R. Trebino, "Crossed-beam spectral interferometry: a simple, high-spectral-resolution method for completely characterizing complex ultrashort pulses in real time," Optics Express 14, 11892-11900 (2006), which is incorporated herein by reference.

Figure 4:
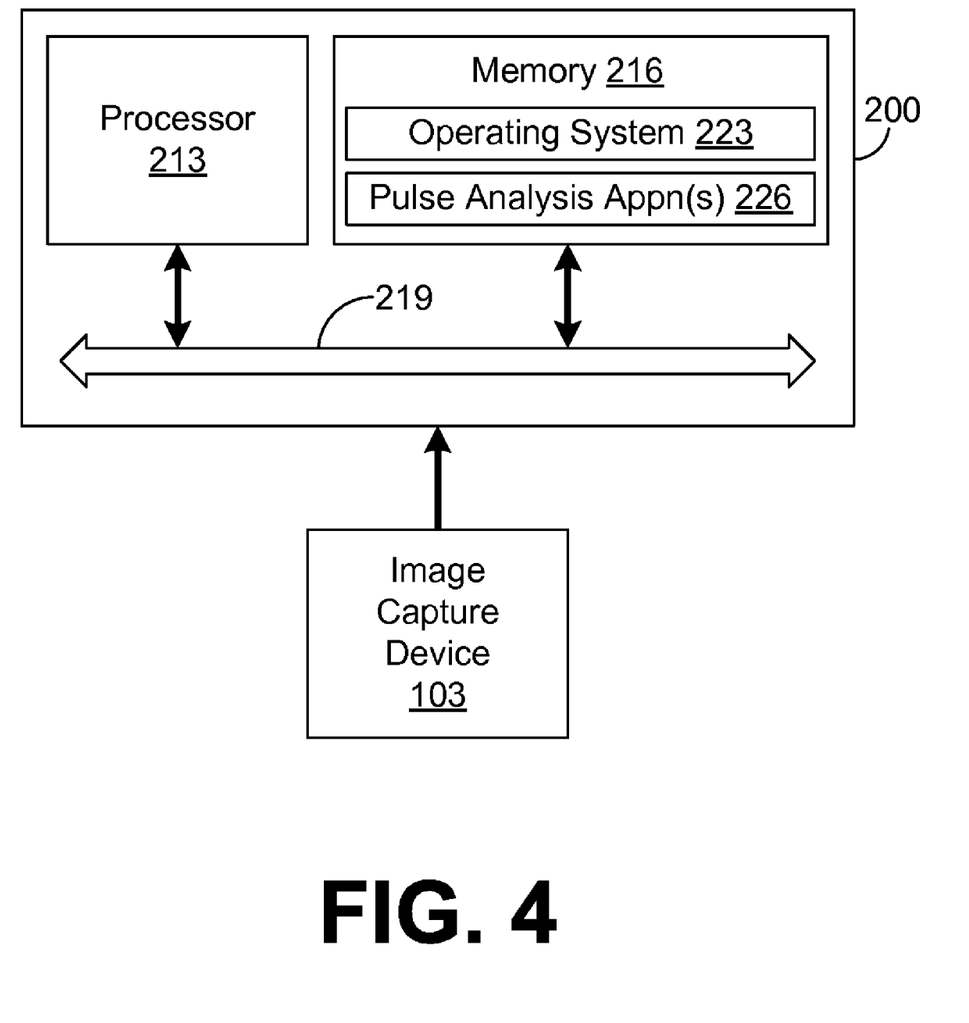
FIG. 4 is a schematic diagram of a processor-based system coupled to a camera employed in the interferometer of FIG. 1 according to an embodiment of the present invention.

Turning then to FIG. 4, shown is a block diagram of a computer system 200 that is attached to the image capture device 103 according to an embodiment of the present invention. The computer system 200 may comprise, for example, a computer, server, dedicated processing system, or other system as can be appreciated. The computer system 200 may include various input devices such as a keyboard, microphone, mouse, or other device as can be appreciated. The computer system 200 includes a processor circuit having a processor 213 and a memory 216, both of which are coupled to a local interface 219. The local interface 219 may be, for example, a data bus with a control/address bus as can be appreciated.

Stored on the memory 216 and executable by the processor 213 are an operating system 223 and a pulse analysis application(s) 226. The pulse analysis application(s) 226 are executed in order to determine a profile of the electric field $E(x, y, \omega)$ of the unknown pulse 143 (FIG. 1). The pulse analysis application(s) 226 may comprise, for example, one or more applications executed to perform various functionality. Such applications may comprise, for example, Matlab, LabView or any compiled code.

The components stored in the memory 216 may be executable by the processor 213. In this respect, the term "executable" refers to a program file that is in a form that can ultimately be run by the processor 213. Examples of executable programs may be, for example, a compiled program that can be translated into machine code in a format that can be loaded into a random access portion of the memory 216 and run by the processor 213, or source code that may be expressed in proper format such as object code that is capable of being loaded into a of random access portion of the memory 216 and executed by the processor 213, etc. An executable program may be stored in any portion or component of the memory 216 including, for example, random access memory, read-only memory, a hard drive, compact disk (CD), floppy disk, or other memory components.

The memory 216 is defined herein as both volatile and nonvolatile memory and data storage components. Volatile components are those that do not retain data values upon loss of power. Nonvolatile components are those that retain data upon a loss of power. Thus, the memory 216 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 213 may represent multiple processors and the memory 216 may represent multiple memories that operate in parallel. In such a case, the local interface 219 may be an appropriate network that facilitates communication between any two of the multiple processors, between any processor and any one of the memories, or between any two of the memories etc. The processor 213 may be of electrical or optical construction, or of some other construction as can be appreciated by those with ordinary skill in the art.

The operating system 223 is executed to control the allocation and usage of hardware resources such as the memory, processing time and peripheral devices in the computer system 200. In this manner, the operating system 223 serves as the foundation on which applications depend as is generally known by those with ordinary skill in the art.

Figure 5:
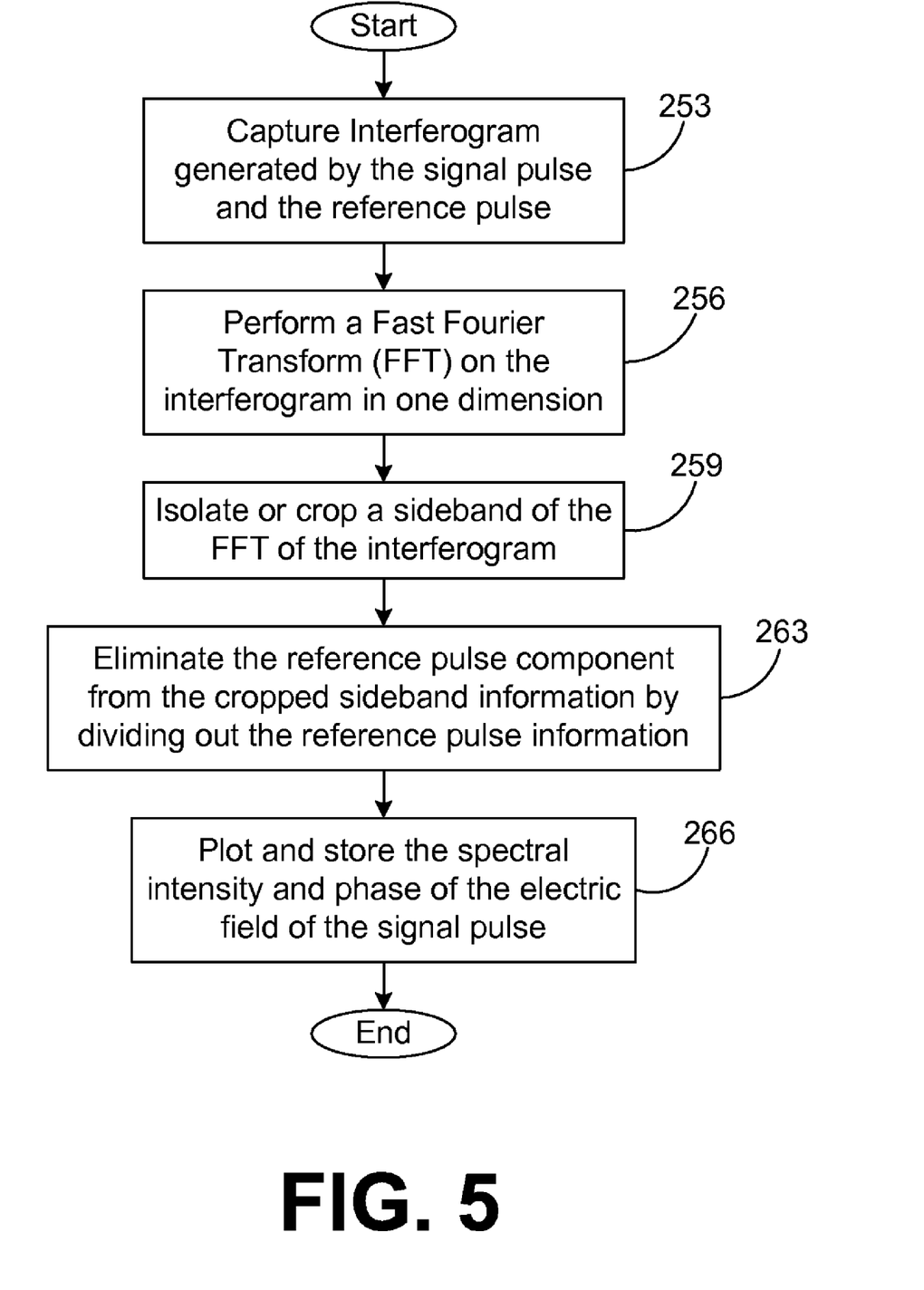
FIG. 5 is a flow chart that provides one example of the operation of a pulse analysis system that analyzes the interferogram of FIG. 3A generated by the interferometer of FIG. 1 according to an embodiment of the present invention.

Referring next to FIG. 5, shown is a flow chart that provides one example of the operation of a pulse analysis application 226 according to an embodiment of the present invention. Alternatively, the flow chart of FIG. 5 may be viewed as depicting steps of an example of a method implemented in the computer system 200 to analyze an interferogram 106 generated on the image capture device 103 as will be described. The functionality of the pulse analysis application 226 as depicted by the example flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The pulse analysis application 226 may be implemented using any one of a number of programming languages such as, for example, C, C++, or other programming languages. Alternatively, the pulse analysis application 226 may comprise, for example, such applications as Matlab, LabView or any compiled code.

Beginning with box 253, first the interferogram 106 is captured using the image capture device 103 and is input into the computer system 200 for further processing. The electric field of the interferogram 106 is expressed as follows:

$$s(x,\omega) = S_{UNK}(\omega) + S_{REF}(\omega) + \cos(\phi_{REF}(\omega) - \phi_{UNK}(\omega) + 2kx \sin\theta) \quad (1)$$

Next, in box 256, a Fast Fourier Transform is performed on the interferogram in a single dimension to produce the FFT image as depicted with respect to FIG. 3B above. Then, in box 259, a side band of the FFT image of the interferogram 106 is isolated or cropped for further processing. The sideband is characterized either by Equation 2 below or its complex conjugate, depending upon which side band is used and depending upon which pulse is on the top when the two cross.

$$E_{SB}(\omega) = \sqrt{S_{UNK}(\omega) S_{REF}(\omega)} \exp(i(\phi_{REF}(\omega) - \phi_{UNK}(\omega)))$$

Then, in box 263, the reference pulse component of the side band isolated in box 259 is eliminated by appropriately dividing out the reference pulse information. Assuming that the electric field of the reference pulse is characterized by the equation $$E_{REF}(\omega) = \sqrt{S_{REF}(\omega)} \exp(i(\phi_{REF}(\omega))), \quad (3)$$

then the electric field $E_{UNK}$ of the unknown pulse 143 may be determined by dividing out the reference pulse information as follows:

$$E_{UNK}(\omega) = \frac{\sqrt{S_{UNK}(\omega)S_{REF}(\omega)} \exp(i(\varphi_{REF}(\omega) - \varphi_{UNK}(\omega)))}{\sqrt{S_{REF}(\omega)} \exp(i\varphi_{REF}(\omega))}. \quad (4)$$

Thereafter, in box 266, the spectral intensity and phase of the electric field is plotted as a function of wavelength for the unknown pulse 143. As explained above, finding the spectral intensity in this way can result in spectral super resolution.

Although the example of the example pulse analysis application 226 set forth above is depicted as being embodied in software or code executed by general purpose hardware as discussed above, as an alternative the same may also be embodied in dedicated hardware or a combination of software/general purpose hardware and dedicated hardware. If embodied in dedicated hardware, the pulse analysis application 226 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 5 shows the functionality and operation of one example implementation of a pulse analysis application 226. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the example pulse analysis application 226 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the pulse analysis application 226 for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Figure 6:
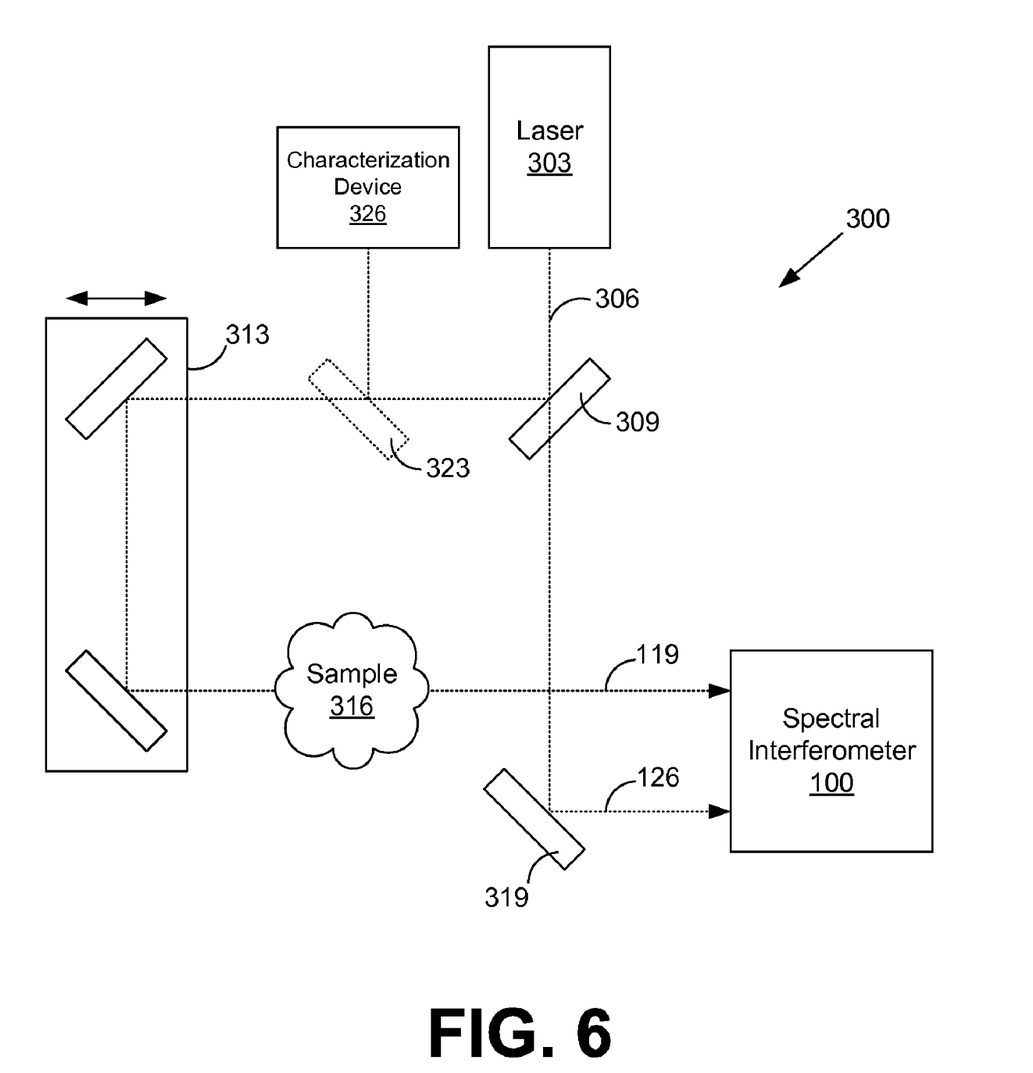
FIG. 6 is a drawing of an optical system that employs the interferometer of FIG. 1 to test a sample according to an embodiment of the present invention.

Turning then to FIG. 6, shown is one example of an optical system 300 that employs the interferometer 100 according to an embodiment of the present invention. As shown, a laser 303 generates a pulse 306 that is directed to a splitter 309. A portion of the pulse 306 is directed to adjustable mirrors 313 and then to a sample 316. The sample 316 may be, for example, at least partially transparent to allow at least a portion of the input pulse 106 to pass through.

The input pulse 306 may be one of a train of pulses generated by a laser 303 such as a train of pico-second or femto-second pulses. An example of such a laser is the mode locked Ti:Sa laser.

The portion of the pulse 306 that exits the laser 303 and continues through the splitter 309 strikes a mirror 319 and then is directed to the interferometer 100. This portion of the pulse 306 acts as the reference pulse 126. The portion of the pulse 306 that propagates through the sample 309 is altered due to the nature of the sample 316 and is applied to the interferometer 100 as the input pulse 119.

In addition, in the path of the reference pulse 126, there is a flip mirror or beam splitter 323, which can be positioned so that the light is deflected to a characterization device 326. The characterization device 326 must be used to characterize the reference pulse 126 and, for best results, should be used each time that laser is restarted. The characterization device 326 may comprise a device such as that described in R. Trebino, "Frequency-Resolved Optical Gating: The Measurement of Ultrashort Laser Pulses" (Kluwer Academic Publishers, 2000). Generally this is a quick measurement that is preformed, for example, once a day, or as often as is required, according to the degree of drifts in the laser. After the measurement is performed, the flip mirror or beam splitter 323 can be positioned so that the characterized reference beam 126 propagates into the interferometer 100.

Because the reference pulse 126 is a simple pulse it can be characterized using a characterization device 326 referenced above, unlike the input pulse 119 which is potentially very complicated in space and/or time. If measurements of only the phase introduced by the sample 316, rather than the total phase of the unknown pulse 119, are desired, then it is not necessary to characterize the reference pulse 126. In this case, the flip mirror or beam splitter 323 and the characterization device 326 can be omitted.

Thus, assuming that the input pulse 306 is uniform in all respects, to the extent that the input pulse 119 is altered and contains distortions or other phenomena when it passes through the sample 316, then the sample 316 may be characterized by such distortions as determined by measuring the electric field intensity and phase of the resulting input pulse 119, as set forth above.

As described above, the laser 303 may generate a series of substantially similar pulses 306 and the input pulse 119 from the sample 316 for each of the pulses 306 generated may be sampled at a different location by manipulating the actuator 131 to move the first optical fiber 109 among various positions, as described above. As a consequence, the electric field of the input pulse 119 may be characterized as described above.

The various types of samples 316 through which the pulse may pass through to generate the input pulse 119 may comprise, a pulse shaper which is an optical synthesizer that can be used to give the input pulse an arbitrary shape in time. The sample 316 may also comprise a lens in which the aberrations of the lens can be characterized using the interferometer.

It should be emphasized that the above-described embodiments of the present invention are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method, comprising the steps of:
propagating an unknown pulse through a first optical fiber;
propagating a reference pulse through a second optical fiber;
directing the unknown pulse and the reference pulse out of the first and second optical fibers into a spectrometer; and
propagating the unknown pulse and the reference pulse along a pair of crossing trajectories through the spectrometer to form an interferogram.

2. The method of claim 1, wherein the unknown and reference pulses propagate out of the first and second optical fibers along a pair of parallel trajectories.

3. The method of claim 2, wherein the unknown and reference pulses propagate through a lens that redirects the propagation of the unknown and reference pulses from the parallel trajectories to the crossing trajectories.

4. The method of claim 1, wherein the interferogram falls incident to an image capture device.

5. The method of claim 1, wherein a step of determining both a phase and intensity as a function of wavelength of the unknown pulse from the interferogram.

6. The method of claim 1, further comprising the step of locating a point of entry of the first optical fiber within a propagation of a cross section of at least one input pulse, wherein the cross section of the at least one input pulse is greater than a cross section of the point of entry of the first optical fiber, where the unknown pulse comprises a portion of the at least one input pulse that enters the first optical fiber.

7. The method of claim 6, wherein the at least one input pulse further comprises a plurality of input pulses, the method further comprising the step of scanning the point of entry of the first optical fiber among a plurality of positions within the propagation of the cross section of the input pulses, where at least one unknown pulse is generated at each of the positions corresponding to a respective at least one of the input pulses.

8. The method of claim 5, wherein the step of determining both the phase and intensity as a function of wavelength of the unknown pulse from the interferogram further comprises the step of determining a spectral-phase difference between the reference pulse and the unknown pulse from a side band of the Fourier transform of the interferogram.

9. The method of claim 8, further comprising the step of determining the intensity as a function of wavelength at a super-resolution.

10. The method of claim 1, further comprising the steps of:
splitting an input pulse into an input unknown pulse and an input reference pulse; and
propagating the input unknown pulse through a sample, where the unknown pulse that enters the first optical fiber comprises at least a portion of the input unknown pulse.

11. An apparatus, comprising:
a first optical fiber through which an unknown pulse propagates;
a second optical fiber through which a reference pulse propagates;
a spectrometer, wherein the unknown and reference pulses are directed from the first and second optical fibers into the spectrometer, wherein the unknown pulse and the reference pulse propagate along a pair of crossing trajectories through the spectrometer to form an interferogram; and
an image capture device, where the interferogram falls incident to the image capture device.

12. The apparatus of claim 11, wherein first and second optical fibers are positioned to direct the propagation of the unknown and reference pulses along a pair of parallel trajectories.

13. The apparatus of claim 12, further comprising a lens positioned at the outlets of the first and second optical fibers, the lens redirecting the propagation of the unknown and reference pulses from the parallel trajectories to the crossing trajectories.

14. The apparatus of claim 11, further comprising an actuator that positions a point of entry of the first optical fiber in at least two dimensions.

15. The apparatus of claim 14, further comprising a control system that causes the actuator to scan the point of entry of the first optical fiber through a plurality of positions.

16. The apparatus of claim 11, further comprising a pulse analysis system operatively coupled to the optical capture device that determines both a phase and intensity as a function of wavelength of the unknown pulse from the interferogram.

17. The apparatus of claim 16, wherein the pulse analysis system further determines a spectral-phase difference between the reference pulse and the unknown pulse from a side band of the Fourier transform of the interferogram.

18. The apparatus of claim 16, wherein the pulse analysis system further determines the intensity as a function of wavelength at a super-resolution.

19. An apparatus, comprising:
a first optical fiber through which an unknown pulse propagates;
a second optical fiber through which a reference pulse propagates;

means for generating an interferogram using the unknown pulse and the reference pulse; and means for capturing the interferogram.

20. The apparatus of claim 19, wherein first and second optical fibers are positioned to direct the propagation of the unknown and reference pulses along a pair of parallel trajectories upon exiting the first and second optical fibers.

21. The apparatus of claim 20, further comprising means for redirecting the propagation of the unknown and reference pulses from the parallel trajectories to the crossing trajectories.

22. The apparatus of claim 19, further comprising means for positioning a point of entry of the first optical fiber in at least two dimensions.

23. The apparatus of claim 22, further comprising means for controlling the means for positioning the point of entry of the first optical fiber to scan the point of entry of the first optical fiber through a plurality of positions.

24. The apparatus of claim 19, further comprising means for determining both a phase and intensity as a function of wavelength of the unknown pulse from the interferogram captured by the means for capturing the interferogram.

* * * * *